June 18, 1935. H. L. MYERS Re. 19,613

PLANETARY TYPE SURFACING MACHINE

Original Filed May 28, 1932 3 Sheets-Sheet 1

Inventor
Harry L. Myers

By Clarence A. O'Brien
Attorney

June 18, 1935. H. L. MYERS Re. 19,613

PLANETARY TYPE SURFACING MACHINE

Original Filed May 28. 1932 3 Sheets-Sheet 2

Inventor

Harry L. Myers

By Clarence O'Brien

Attorney

June 18, 1935. H. L. MYERS Re. 19,613

PLANETARY TYPE SURFACING MACHINE

Original Filed May 28, 1932 3 Sheets-Sheet 3

Inventor

Harry L. Myers

By Clarence A. O'Brien

Attorney

Reissued June 18, 1935 Re. 19,613

UNITED STATES PATENT OFFICE 19,613

PLANETARY TYPE SURFACING MACHINE

Harry L. Myers, Toledo, Ohio, assignor to The American Floor Surfacing Machine Company, Toledo, Ohio, a corporation of Ohio Original No. 1,919,389, dated July 25, 1933, Serial No. 614,182, May 28, 1932. Application for reissue April 1, 1935, Serial No. 14,960

13 Claims. (Cl. 51—177)

This invention relates to an improved floor surfacing machine of the rotary disc planetary type especially constructed for grinding, rubbing and polishing various kinds of composition floors, such as for example, terrazzo, mosaic, marble and the like.

I deem it important and advisable to mention here the fact that the invention shown and described in this application is fundamentally and generically similar to the companion invention represented in the copending parent application filed this 28th day of May, 1932, and designated by Serial Number 614,181.

A structural comparison of the two applications will disclose the fact that the machine herein claimed is also of the multiple disc ensemble planetary type. In other words, the machine comprises a portable truck supported carriage which includes a perpendicular motor driven shaft for operating a horizontally disposed revoluble head which revolves on a predetermined fixed center, said head carrying a multiplicity of co-related duplicate companion surface rubbing or abrading units rotatable on their individual axes. Incidentally this planetary type of heavy duty machine for floor work of the kind specified is not new in the art or the trade.

The purpose of the present invention is to provide the trade with a structurally improved and materially refined machine characterized by a revoluble self-levelling head having the distinguishable rotary surfacing units and a special power transmission means for said units located in the confines of the head, thereby providing an arrangement which is calculated to better fulfill the requirements of a machine of this kind while at the same time minimizing lubrication.

This type of machine, it is submitted, is ideal to use for rubbing in the mastic and polishing the floor on the final finishing operation. It is such in construction as to uniformly surface high and low spots, eliminate an appreciable amount of labor usually expended in accurately levelling or smoothing up the floor when laying the terrazzo.

The invention, as will become apparent from the drawings and description, comprehends the provision of a thoroughly practical up-to-date construction notable in particular as an appreciable addition to the prior art in that it includes an unequalled style and type of planetary abrading unit drive believed to be an achievement in the building of this particular variety of machine.

Briefly stated, the improved machine comprises a suitable wheel supported or portable support which includes a vertical stationary guide for a co-operating perpendicular drive shaft appropriately mounted in the guide. On the drive shaft is a revoluble head and between the head and shaft is a flexible operating connection which is such as to permit the head to be substantially self-levelling to compensate for irregularities in the surface of the floor.

A plurality of individually rotatable surface conditioning units are mounted for rotation on the marginal portion of the head so that while the head revolves around a fixed center the desired planetary rotary motion is imparted to the units.

The principal novelty resides in an arrangement of the aforesaid type wherein the head is of hollow construction to serve as a housing for the planetary drive which comprises a centrally disposed fixed pulley or equivalent operating member, which operates in conjunction with alined supplementary pulleys, all of said pulleys being arranged in a common plane to accommodate a double V-type belt co-operating with the fixed pulley in such a manner as to rotate the supplemental pulleys when the head is revolving.

Other features and advantages of the invention will become more readily apparent from the following description and drawings.

Figure 1:
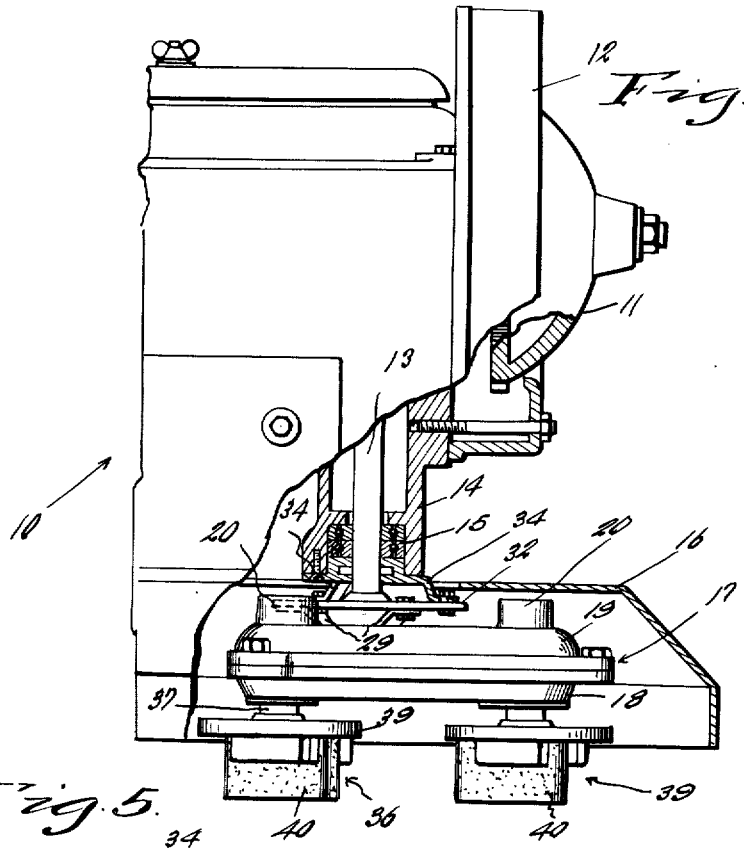
Figure 1 is a view of the improved machine showing a fragmentary portion of the portable support which, in practice is provided with an electric motor drive (not shown), the improved planetary device being shown in elevation.
Figure 5:
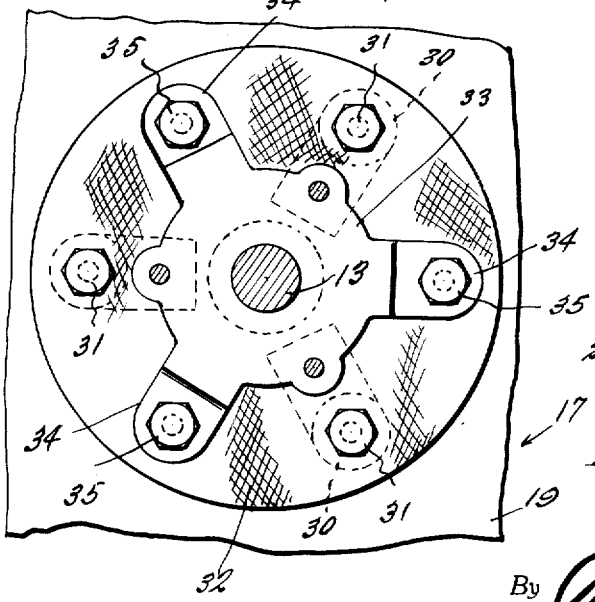
Figure 5 is a horizontal sectional view taken on the plane of the line 5—5 of Figure 3.
Figure 9:
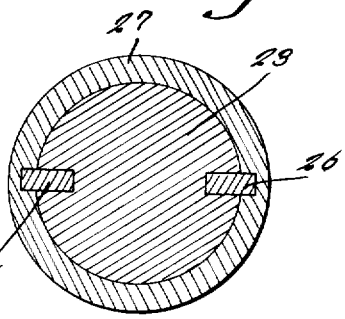
Figure 9 is a cross section taken on the plane of the line 9—9 of Figure 3.

Referring now to the preferred embodiment of the invention as exemplified in the drawings it will be observed that the numeral 10 in Figure 1 designates a fragmentary portion of a part of a conventional machine hereinafter referred to as a portable support. In actual practice this is a major part of a wheeled truck supported casing carrying an electric motor (not shown) which motor drives a sprocket chain (not shown) trained over the sprocket wheel 11, said chain operating in the shield 12.

Through the medium of appropriate gearing (not shown) located in the casing 10 the perpendicular drive shaft 13 is operated. It will be noticed in Figure 1 that this shaft extends down through a vertical tubular fixed guide 14 having an appropriate end thrust bearing 15. The numeral 16 merely designates a conventional apron or guard, all of the aforesaid parts being old in the trade and the art.

Figure 3:
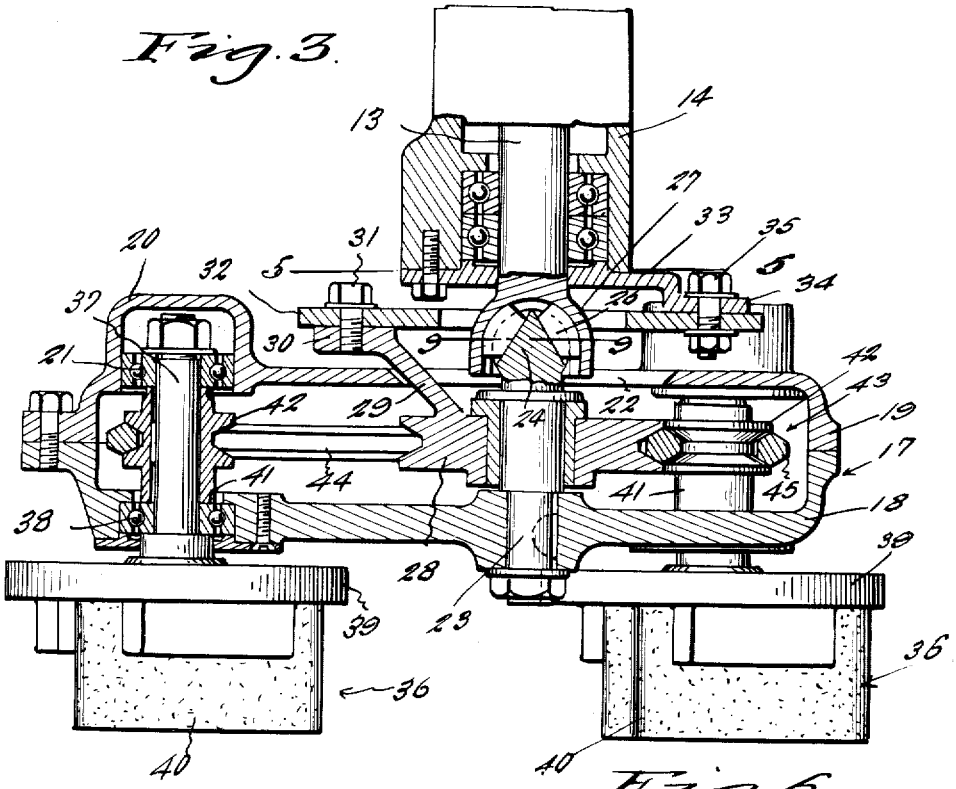
Figure 3 is an enlarged detail sectional and elevational view taken on the plane of the line 3—3 of Figure 2.
Figure 6:
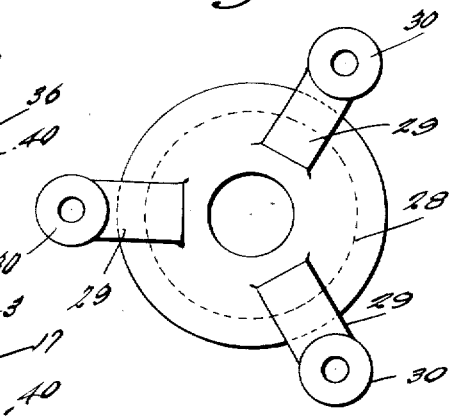
Figure 6 is a top plan view of the primary or main friction drive pulley.
Figure 2:
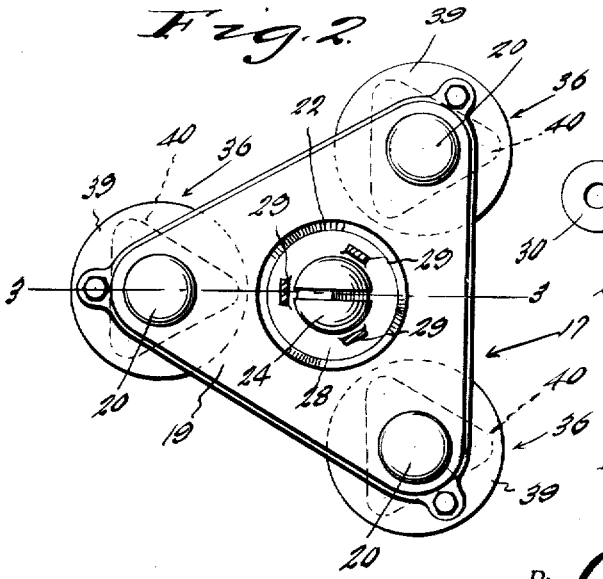
Figure 2 is a horizontal sectional view of the planetary device per se as depicted in Figure 1.

The revoluble head in Figure 1 is designated as a unit by the numeral 17. As shown in Figure 3 however it will be observed that the head is actually in the form of a hollow casing of general triangular configuration in top plan view. The lower section 18 may be designated as the body portion and the top section 19 as a removable cover. The cover is bolted or otherwise secured to the body as represented in the drawings and is provided with upstanding portions 20 which serve as sockets to accommodate the roller bearing assembly 21.

It will be noticed that the central portion of the cover plate is provided with an opening 22. Disposed in alinement with the drive shaft 13 is a relatively short driven shaft 23 which is keyed to the body 18 of the head. This shaft 23 is provided at its upper end with a spherical head 24 having opposed kerfs or notches 25 constituting keyways for reception of the keys 26 mounted rigidly in the socket 27 on the lower end of the drive shaft 13. This arrangement serves to couple the shafts 13 and 23 together and to provide the requisite universal or ball and joint connection which allows the head 17 to be revolved but at the same time self-levelling.

The numeral 28 designates the main planetary drive pulley surrounding the driven shaft 23. The pulley is provided with radial arms 29 terminating in heads 30 secured by bolts 31 to the thermoid coupling annulus or ring 32. This ring is located between the guide 14 and the head being exteriorly arranged with respect to the head. Moreover, the arms 29 of the pulley extend through the opening 22 in the head and are connected to the ring 32 at circumferentially spaced points.

The numeral 33 designates what may be conveniently referred to as a spider, this being rigidly bolted to the lower end of the guide 24 and having circumferentially spaced arms 34 fastened by bolts 35 to the flexible driving ring 32 at points between the bolt connections 31. By fastening the spider 33 rigidly to the stationary guide 14 and connecting it to the pulley through the medium of the ring 32 and arms 29, the pulley is supported in a substantially horizontal plane and prevented from rotation. This provides the requisite flexible connection between the pulley and guide 14 so that the pulley may remain in a substantially even plane and rock with the head 17 as a complemental part. The universal joint connection thus provided between the guide 14 and member 28 is without or embraces the joint between the adjacent ends of the drive shaft sections 13 and 23, and the center rocking points of the two joints are substantially coincident.

The rubbing or abrading devices or units are individually denoted by the numerals 36 and these may be of any appropriate construction. As here shown each unit comprises a stub shaft 37 mounted in the bearings 21 and additional bearings 38. A backing plate 39 is attached to the shaft and constructed to accommodate the abrading block or stones 40.

Sleeves 41 surround the stub shafts 37 and are keyed thereto, each sleeve being formed with a supplemental pulley 42 in alinement with the main pulley 28.

Figure 4:
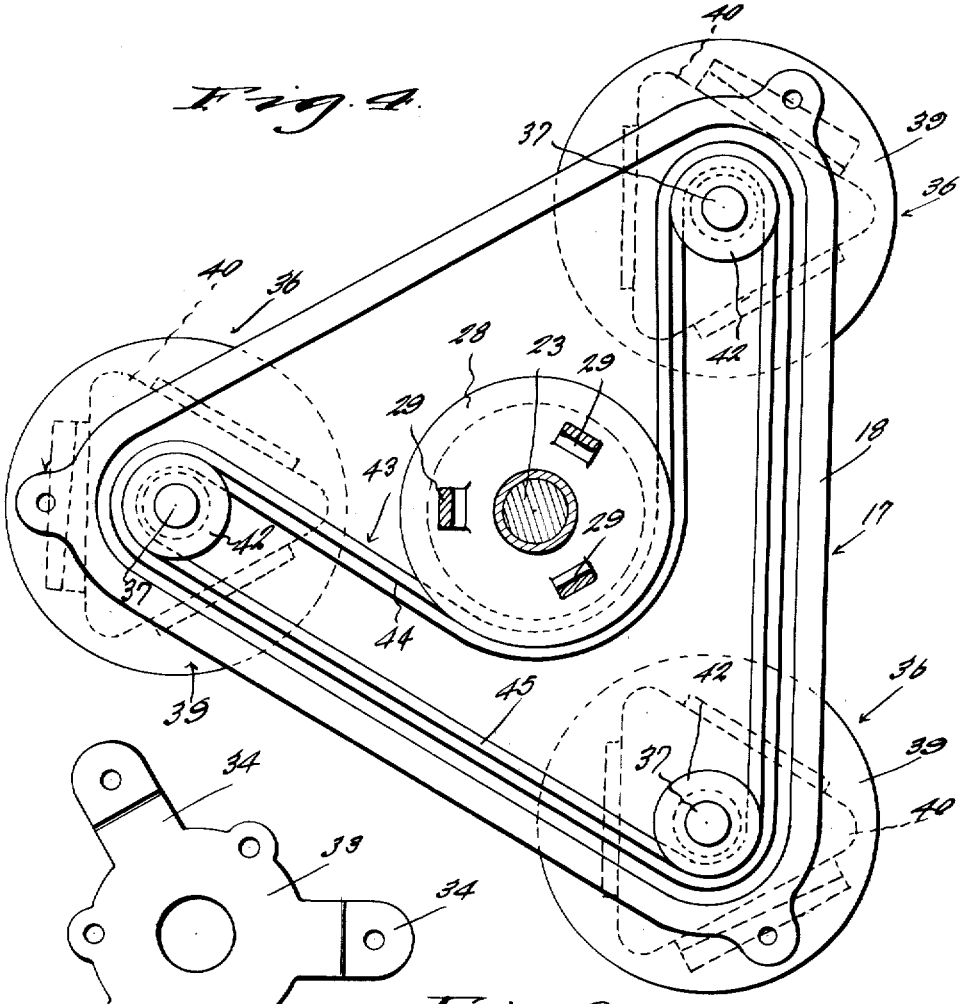
Figure 4 is a plan view of the revoluble head with the cover plate removed to show the internal details.
Figure 7:
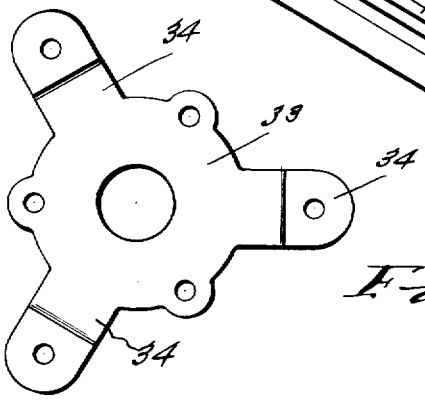
Figure 7 is a bottom plan view of an anchoring or attaching spider.
Figure 8:
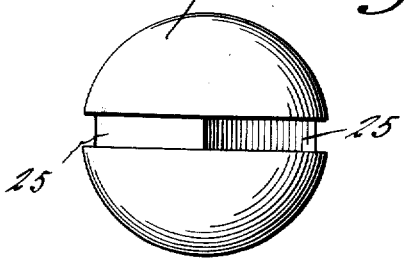
Figure 8 is an enlarged plan view of the driven shaft.

Attention is now invited to Figure 4 wherein the pulley assembly is shown completely. As seen here, the numeral 43 designates a tracking belt of double V-shaped form having its smaller flight 44 trained over approximately one-half of the pulley 28 and having its outer larger flight 45 trained over the small or supplemental pulleys 42.

It will be noticed that the belt is substantially diamond-shaped in cross section and that one tracking edge thereof co-operates with the pulley 28 while the opposed tracking edge co-operates with the pulleys 42.

The gist of the invention is that the revoluble head 17 is in the form of a hollow casing which houses the flexible belt and pulley arrangement, and also that the joint between the drive sections 13 and 23 is within the joint between the members 14 and 28, and their center points are substantially coincident. I desire to mention however that although I have shown pulleys and a driving belt co-operating frictionally with the pulleys other suitable means of a planetary type, wherein rotation may be imparted to the shaft 37 from a central stationary member 28 upon a rotation of the head 17 relative thereto, may be employed.

To avoid lubrication however it is believed that the belt arrangement is superior. Another essential point of merit is that by providing a casing-like head, free rotating bearings may be supplied for the stub shaft 37 of the individual rotary unit 36. Moreover, the employment of a sectional casing head facilitates assembling and affords protective means for the belt and pulleys. Then too, the flexible operating connection between the shafts 13 and 23 is important in that it provides the requisite self-levelling feature of the head construction. Further, the flexible connecting web or ring 32 co-operating with the stationary spider 33 and the pulley 28 for holding the pulley stationary is important, particularly so in that the connecting bolts between said parts are arranged exteriorly of the head to permit access to be had thereto. Finally, the diamond-shaped belt is reversible and provides a positive drive between the stationary pulley 28 and the complemental rotary pulleys 42 in order to secure a practical planetary action.

It is thought that the description taken in connection with the drawings will enable a clear understanding of the invention to be had. Therefore, a more lengthy description is deemed unnecessary.

While the preferred embodiment of the invention has been shown and described, it is to be understood that minor changes coming within the field of invention claimed may be resorted to if desired.

Having thus described my invention, what I claim as new, and desire to secure by United States Letters Patent, is:

1. In a machine of the class described, a fixed guide, a power actuated drive shaft mounted for rotation in said guide, a revoluble head, a plurality of rotary surfacing units mounted on said head, a driven shaft in alinement with said drive shaft, a universal joint securing said shafts together for simultaneous rotation, said driven shaft being keyed to said head to revolve the head, a flexible annular web, means fixedly securing said web to the guide, a fixed friction drive member surrounding said driven shaft and connected with said web, the web being interposed between said member and guide, and operating means for said rotary units cooperable with said fixed driving member.

2. In a machine of the class described, a vertical fixed guide, a perpendicular motor actuated drive shaft mounted for rotation in said guide, a hollow casing-like revoluble head, a driven shaft keyed centrally to said head and disposed in alinement with said first-named shaft, a universal joint connecting said shafts together to permit said head to be substantially self-levelling and to compensate for irregularities in surface being treated, a plurality of rotary surface abrading units mounted for rotation on said head, operating means for said units, a spider fixed to said guide, a flexible ring interposed between and connecting the spider and a central part of said operating means to anchor one against rotation relative to the other when the head is driven and to permit rocking movements of the part relative to the guide.

3. A machine of the class described comprising a fixed guide, a main drive shaft mounted for rotation in said guide, a hollow revoluble head, a plurality of surfacing units carried for rotation by said head, a centrally disposed driven shaft keyed in said head and joined to said first-named shaft through the medium of a universal joint, a power transmitting element in said head surrounding said driven shaft, a spider secured to said guide, a flexible coupling ring encircling the driven shaft axis and attached to said spider, said element having connection with said ring in alternating relation to said spider, and means connecting said element and surfacing units to relatively drive the latter when the head is driven.

4. A machine of the class described comprising a fixed guide, a main drive shaft mounted for rotation in said guide, a hollow revoluble head, a centrally disposed driven shaft keyed to said head and joined to said first-named shaft through the medium of a universal joint, a pulley surrounding said driven shaft and having arms, a spider secured to said guide, a flexible coupling ring connecting the pulley arms and spider, said head being provided with circumferentially spaced bearings, a plurality of individual rotatable floor abrading units mounted for rotation in said bearings, supplemental drive pulleys for said units, said pulleys being located in said head, and a belt trained over said first pulley and said supplemental pulleys to effect rotation of said units while said head is being revolved.

5. A machine of the class described comprising a fixed guide, a main drive shaft mounted for rotation in said guide, a hollow revoluble head, a centrally disposed driven shaft keyed to said head and joined to said first-named shaft through the medium of a universal joint, a pulley surrounding said driven shaft and having arms, a spider secured to said guide, a flexible coupling ring connecting the pulley arms and spider, said head being provided with circumferentially spaced bearings, a plurality of individually rotatable floor abrading units mounted for rotation in said bearings, supplemental drive pulleys for said units, said pulleys being located in said head, and a belt trained over said first pulley and said supplemental pulleys to provide for rotation of said units while said head is being revolved, said belt being doubled upon itself into double-V formation one V-shaped portion thereof cooperating with the fixed pulley and the remaining V-shaped portion thereof cooperating with the supplemental drive pulleys.

6. A machine of the class described comprising a vertical fixed guide, a power actuated drive shaft mounted for rotation in said guide, a hollow casing-like revoluble head, a driven shaft in said head rigidly attached to the central portion thereof and disposed in alinement with said first-named shaft, a universal joint connecting said shafts together for operation in unison, a pulley arranged within the confines of said head and surrounding said driven shaft, the top of said head being formed with a central opening alined with said guide, said pulley having radial arms extending upwardly through and beyond said opening, a spider plate fastened securely to said fixed guide and provided with radial arms, a flexible connecting ring, said spider arms and pulley arms being bolted to said ring in alternating order, a plurality of surfacing units mounted for rotation in said head, and a motion transmitting belt operatively connected with said units and pulley.

7. A machine of the class described comprising a vertical fixed guide, a power actuated drive shaft mounted for rotation in said guide, a hollow revoluble head, a driven shaft rigidly attached to the central portion of said head and disposed in alinement with said first-named shaft, a universal joint connecting said shafts together for operation in unison, a main pulley arranged within the confines of said head and surrounding said driven shaft, the top of said head being formed with a central opening, said pulley having radial arms extending upwardly through and beyond said opening, a spider plate fastened securely to said fixed guide and provided with radial arms, a flexible connecting ring, said spider arms and pulley arms being bolted to said ring in alternating order, said head being provided with vertical circumferentially spaced bearings, a plurality of abrading units mounted for individual rotation in said bearings and provided with supplemental pulleys arranged in a plane substantially even with said fixed main pulley, and a friction driving belt trained over said pulleys.

8. In a machine of the class described, a sectional hollow revoluble head provided with a central fixedly keyed driven shaft, the upper cover section of said head being centrally apertured, a main pulley surrounding said driven shaft and provided with a plurality of circumferentially spaced radial arms extending upwardly through and beyond the aperture in said cover section, said head being provided with circumferentially spaced bearings, a plurality of individually rotatable surface treating units having stub shafts mounted for rotation in said bearings, a plurality of individual supplemental pulleys attached to said stub shaft, and a single belt trained over all of said pulleys.

9. In a machine of the class described, a portable support, a rotatable head, a drive shaft journaled in said support and having driving connection with said head, said shaft having a universal joint intermediate the support and its point of connection with the head, a plurality of driven shafts carried by the head around its axis of rotation and substantially parallel thereto, an abrading member carried by each driven shaft, means operable to rotate said driven shafts when the head is rotated with the drive shaft, said means including an element anchored against rotation relative to the support and concentric to the head axis of rotation, and an anchoring connection between said support and element including a universal joint, the center rocking point of which is substantially coincident with that of the universal joint of the drive shaft.

10. In a machine of the class described, a portable support, a rotatable head, a drive shaft journaled in said support and having driving connection with said head, said shaft having a universal joint intermediate the support and its point of connection with the head, a plurality of abrading member carrying shafts journaled in said head in substantial parallel relation to each other and to the drive shaft axis, means operable to rotate said member shafts when the head is rotated, said means including an element anchored against rotation relative to the support and concentric to the head axis of rotation, and an anchoring connection between said support and element including a universal joint structure surrounding the universal joint of the drive shaft and having its center rocking point substantially coincident with that of said first joint.

11. In a machine of the class described, a portable support, a rotatable head, a drive shaft journaled in the support and having a separate coaxial extension without the support in driving connection with the head, a universal joint connection between the shaft and its extension, an abrading member carrying shaft journaled in said head in offset relation to the drive shaft extension, means operable to rotate said offset shaft on its axis when the head is rotated, said means including an element centered with respect to the drive shaft extension and mounted for universal rocking movements therewith, and a connection between said support and element anchoring one against rotation relative to the other and including a universal joint structure without the joint of said drive shaft and its extension, the center rocking points of said joints being substantially coincident.

12. In a machine of the class described, a portable support, a hollow rotatable head having an opening in its top, a drive shaft journaled in the support and having an extension fixedly connected to the head through its opening and in universal joint connection with the shaft, a plurality of abrading member carrying shafts journaled in said head, means located in the head and operating to rotate said shafts on their respective axes when the head is rotated by the drive shaft, said means including an element centered with respect to the drive shaft extension and mounted for rocking movements therewith, and a connection between said element and support projecting through said head opening and anchoring the connected parts against relative rotation while permitting rocking movements of the element with the head, said drive shaft joint being within said anchoring connection.

13. In a machine of the class described, a portable support, a hollow rotatable head, having an opening in its top, a drive shaft journaled in the support and having an extension fixedly connected to the head through its opening and in universal joint connection with the shaft, a plurality of abrading member carrying shafts journaled in said head, means located in the head and operating to rotate said shafts on their respective axes when the head is rotated by the drive shaft, said means including an element centered with respect to the drive shaft extension and mounted for rocking movements therewith, and a connection between said element and support projecting through said head opening and anchoring the connected parts against relative rotation while permitting rocking movements of the element with the head, said anchoring connection embracing said drive shaft joint and including alternating arms on said support and element, and a flexible member joining said arms to permit universal rocking movements of the element relative to the support.

HARRY L. MYERS.